United States Patent [19]

Atkinson

[11] 4,059,226
[45] Nov. 22, 1977

[54] HEAT COLLECTOR AND STORAGE CHAMBER

[76] Inventor: David L. Atkinson, 23608 48 West, Mountlake Terrace, Wash. 98043

[21] Appl. No.: 719,365

[22] Filed: Sept. 2, 1976

[51] Int. Cl.² .................................................. F24J 3/02
[52] U.S. Cl. ..................................... 237/1 A; 126/400; 126/270
[58] Field of Search ................. 126/270, 400; 236/1 A

[56] References Cited

U.S. PATENT DOCUMENTS

| 3,987,786 | 10/1976 | Keyes et al. | 126/400 |
| 4,016,861 | 4/1977 | Taylor | 126/400 |

Primary Examiner—Carroll B. Dority, Jr.

[57] ABSTRACT

A solar energy heat collector and storage chamber is provided with fixed side, rear, top, and bottom walls. A glass front wall permits sun rays to pass inwardly therethrough to heat rock pieces and also functions to help any heat from passing outwardly therethrough. This glass wall extends forwardly and downwardly. Behind and in spaced relation to this glass wall is a mesh screen wall which is preferably parallel thereto. Behind and in spaced relation to this screen wall are first and second baffle walls, the first forming with the screen wall a first rock chamber and the second forming with the first thereof, a second rock chamber. The first baffle wall extends from the top or bottom wall as a first wall, toward and short of the other wall thereof, while the second baffle wall extends from the other toward and short of the first wall. Such screen, first and second walls provide therebetween a circuitous passageway formed of first and second interconnected rock chambers, which are filled with irregular shaped pieces of rock, through which air may be circulated. The number of pairs of passageways and the length of the circuitous passageway may be increased and illustrative thereof, four are shown. The collector and storage chamber is connected with the hot air plenum chamber and cold air returns of a conventional hot air furnace. The furnace may utilize heat sources separate from the collector and storage chamber or the chamber may be the source of heat for the furnace.

9 Claims, 3 Drawing Figures

HEAT COLLECTOR AND STORAGE CHAMBER

BACKGROUND OF THE INVENTION

1. Field of the Invention

The invention relates to a receptacle, for irregular shaped pieces of rock, having passageways therethrough so that one layer of black surfaced rock may be exposed to sun rays at times when such rays are available as a source of heat and the balance of the rocks function in the combination collector and heat storage unit.

2. Prior Art

Collectors of heat from solar rays are old but not as a part of a combination collector and heat storage unit. The present combination of rock layers with rocks of irregular shapes, providing air passages through the rock layers and with some thereof exposed to the sun's rays, all in combination with air circulation and in combination with the air flowing in a hot air furnace appears to be absent in the prior art.

SUMMARY OF THE INVENTION

The invention contemplates a heat collector and heat storage unit having fixed side, rear, top, and bottom walls. The front wall of the chamber is formed by a glass pane, which extends forwardly and downwardly from the top of the chamber. The chamber and particularly this glass is preferably located where the glass pane is exposed to the maximum quantities of sun rays available in any given day at a given location. Within the chamber and preferably parallel to the front glass wall thereof, is a mesh screen wall. The size of the mesh of the screen is sufficiently small so that the screen will retain irregular shaped pieces of rock. The rocks forming the rock layer surface directly adjacent the front glass pane have or are provided with a black surface to permit such rocks to retain heat.

Inwardly of the screen wall, a pair of spaced apart first and second baffle walls are provided to provide first and second interconnecting chambers. The first baffle wall is connected with either the top or bottom, as a first wall, and extends generally vertically toward but somewhat removed from the other of said top or bottom walls, as a second wall, and the second baffle wall is connected with the second wall and extends toward but removed from the first wall. Pieces of rock of random size and shape are disposed in the pair of first and second chambers and a circuitous passageway is provided through the spaces between the rocks, alongside one of the baffle walls, about said baffle wall, and then along the second baffle wall. The circuitous passageway between pieces of rock is extended by the using of more than one pair of rock chambers, and in the drawings two pair are shown to illustrate a plurality thereof.

An air circulation system is provided so that heat collected on the surface of a layer of rocks having a black surface and exposed to the sun will be in the path of flow of air circulated therepast and over other rock surfaces so that the other rock surfaces become rock pieces functioning as a heat storage means.

The front wall of the receptacle is also provided with a pair of heat insulated doors. One of these doors is hingedly connected with the top wall of the receptacle and the other to the bottom wall of the receptacle. These doors are in open position when there are sufficient sun rays to warrant collecting and are closed at other times to limit heat dissipation through the glass front pane. Also, both doors have an inside reflecting surface so that when the doors are in open position, they can be angularly disposed so that the inner reflecting surfaces cause the reflection of additional rays from the sun into the rocks forming the heat collector chamber.

Also, the rock, heat collector and storage unit provides a circuitous passageway through the spaces between rocks so that the air circulated in a conventional hot air furnace may be circulated through the rocks, heat collector, and storage unit when the temperature of the rocks in such spaces warrants the use thereof as a source of heat.

Other advantages and objects of the present invention will become implicit and explicit as the description of the invention proceeds in connection with the drawings, wherein the invention is described in connection with the details illustrated as a preferred form, but not as a limitation, of the scope of the invention, and throughout which description like reference numerals will relate to like parts in the drawings.

DESCRIPTION OF INVENTION AS ILLUSTRATED

Figure 1:
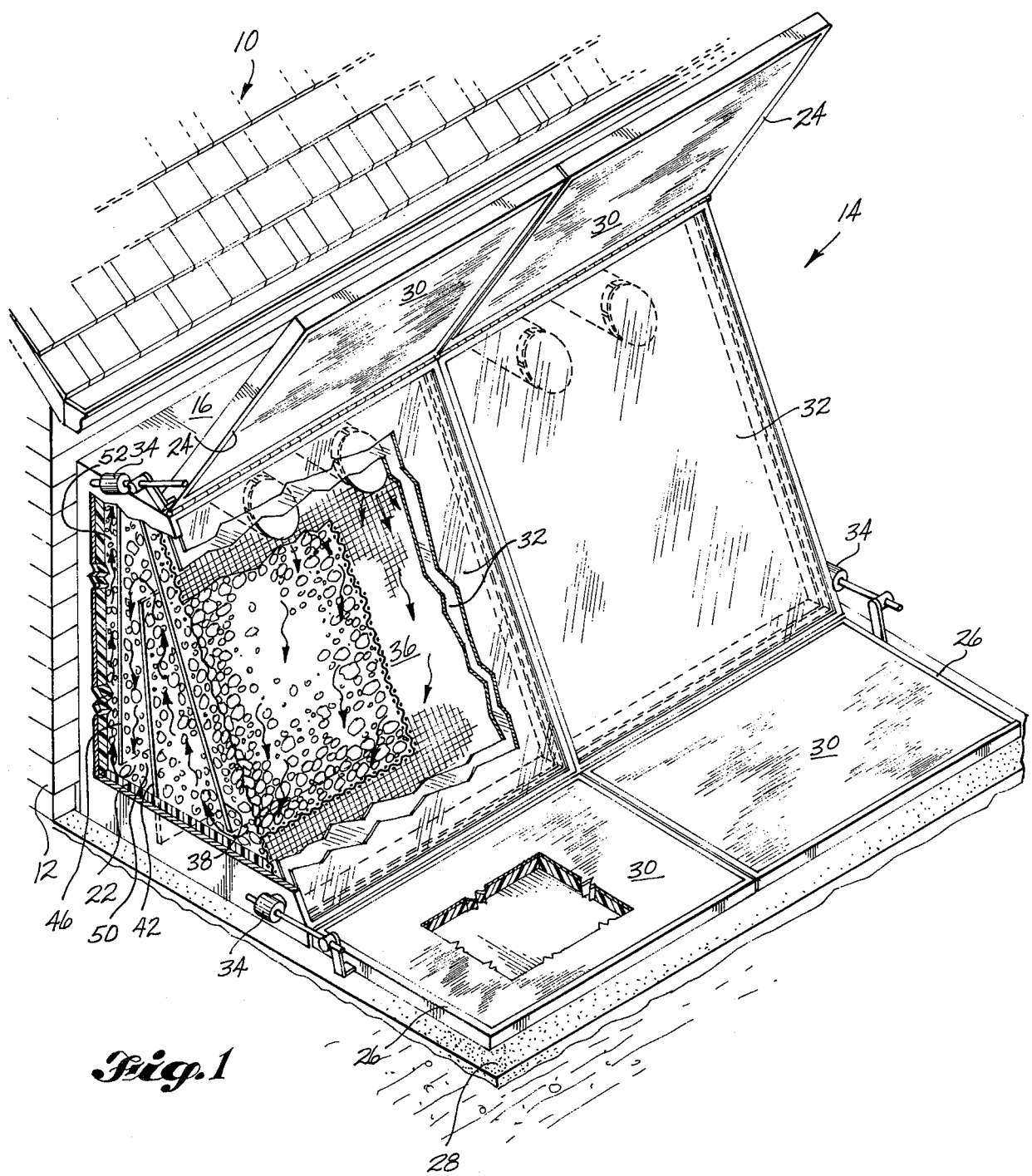
FIG. 1 is a perspective view, with parts broken away, of a form of the present invention.

A portion of a house 10 is shown and the device of this invention may be supported adjacent one wall thereof. If the house has not been built and is to be built to associate the present invention as a part thereof, the house should be oriented on a building site to have a south wall. If the house has already been built, the most southerly wall may be used against which the present invention may be erected. Against such house side wall 12, the heat collector-storage unit 14 is disposed. The unit is provided with heat insulation walls: top walls 16, bottom wall 18, rear wall 20, side walls 22, upper doors 24, and lower doors 26. These heat insulation walls provide against undue heat losses of heated air passing therethrough. A foundation, as a concrete slab 28, supports the heat collector-storage unit.

The size of the installation shown in the drawing is such that two doors 24 and two doors 26 are shown, but obviously the number of doors will vary with the size of the installation. Each of the doors 24, 26 has a sun ray reflecting surface 30 disposed on its inner face and the doors may be opened at the desired angle so as to best utilize these surfaces in reflecting rays into the unit through the front glass wall 32. This glass wall 32 is preferably formed with double panels and this wall 32 seals the front of the unit 14 and is disposed between side walls 22, top wall 16, and bottom wall 18. This glass wall 32 preferably extends forwardly and downwardly.

An electrically controlled door operating means 34 is connected with each door 24 and 26 so such doors 24 and 26 may be closed when there are no sun rays available as a heating source and the doors 24 and 26 opened the desired extent and at the desired angle to best utilize the reflecting surfaces 30 of the doors 24 and 26 to reflect available sun rays through glass wall 32.

A mesh screen wall 36 forms the front rock retaining wall of a first rock retaining chamber 40 and a first, generally vertically extending baffle wall 38 forms the rear wall of said chamber. The rocks in said chamber 40 are pieces of irregular shape and the rock size and mesh of the screen wall 36 are selected to retain the rock pieces in the chamber 40. Also, the rock surfaces adjacent the screen wall 36 are black, either naturally or painted, to enhance the heat retaining character of the rock surface area exposed to the sun's rays.

A second baffle wall 42 is disposed in spaced relation to the first baffle wall 38 and extends generally vertically. This wall 42 forms, with the wall 38, a second rock retaining chamber 44 for pieces of rock.

The first and second rock baffle walls 38 and 42 are connected with side walls 22. As illustrated, the first baffle wall 38 is also connected with the top wall 16 and extends toward but short of the bottom wall 18. With the first baffle wall 38 so affixed, the second baffle wall 42 is connected with the bottom wall 18 and extends toward but short of the top wall 16. Thus, a circuitous passageway is provided for air passing through said two chambers 40 and 44. However, the first baffle wall 38 may be connected with the bottom wall 18 and extend toward but short of the top wall 16 in combination with a second wall 42 connected with a top wall 16 and extending toward but short of the bottom wall 18. Preferably, the construction is used with the first baffle wall 38 connected with the top wall 16 and the second baffle wall connected with the bottom wall 18 as illustrated.

An additional baffle wall, as third baffle wall 46, may be used to increase the length of the circuitous passageway and to increase the storage capacity by providing additional rock storage capacity and provide third and fourth rock retaining chambers 50 and 52. This third chamber 50 is formed between second baffle wall 42 and third baffle wall 50. The fourth chamber 52 is formed between the third baffle wall 46 and the rear wall 20.

Where the first and second baffle walls 38 and 42 are connected, respectively, with the top and bottom walls 16 and 18, then third baffle wall 46 is connected with top wall 16 and extends toward but short of bottom wall 18. When the first and second baffle walls 38 and 42 are connected, respectively, with the bottom and top walls 18 and 16, then the third baffle wall 50 is connected with the bottom wall 18 and extends toward but short of the top wall 16.

All of the baffle walls 38, 42, and 46 connect between side walls 22 and the air flow is restricted to over the end of the baffle wall which is short of either the top or bottom wall 16, or 18.

Figure 2:
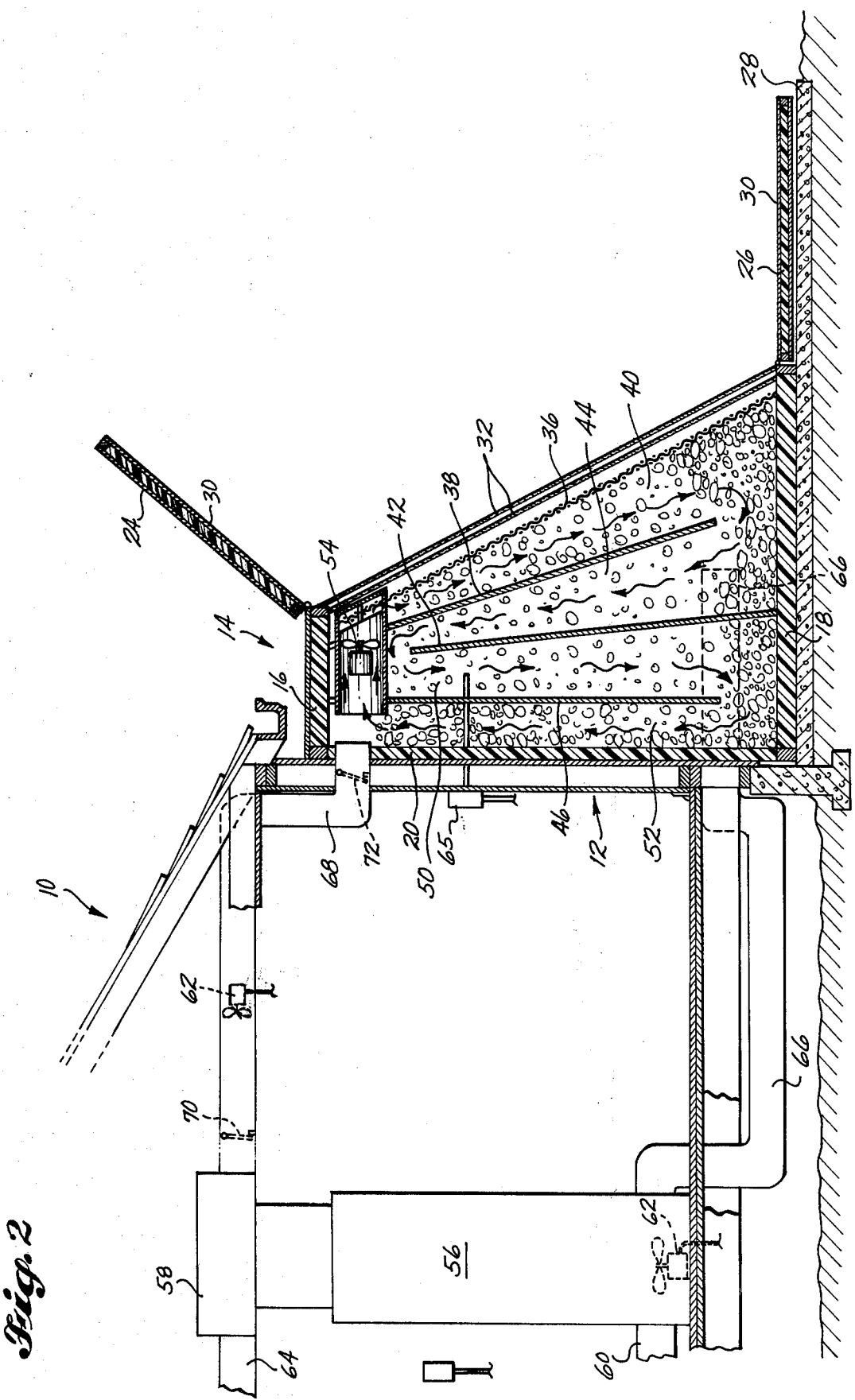
FIG. 2 is a side view, with parts in section, showing the structure of FIG. 1 in connection with a hot air furnace, with fragments of housing to include therein such a heating system, and showing the invention operating in its heat storage cycle.

Means to cause air circulation through first, second, third, and fourth rock retaining chambers 40, 44, 50, and 52 is illustrated by electric motor driven fan means 54. As illustrated in FIG. 2, such fan means 54 causes downward, thence upward, thence downward, and thence upward air flow in the chambers 40, 44, 50, and 52. This air flow may be continued while the rock faces in chamber 40 are exposed to sun rays and thus heat so collected from the black faced rock pieces in chamber 40 will be distributed throughout the rocks in chambers 40, 44, 50, and 52.

Figure 3:
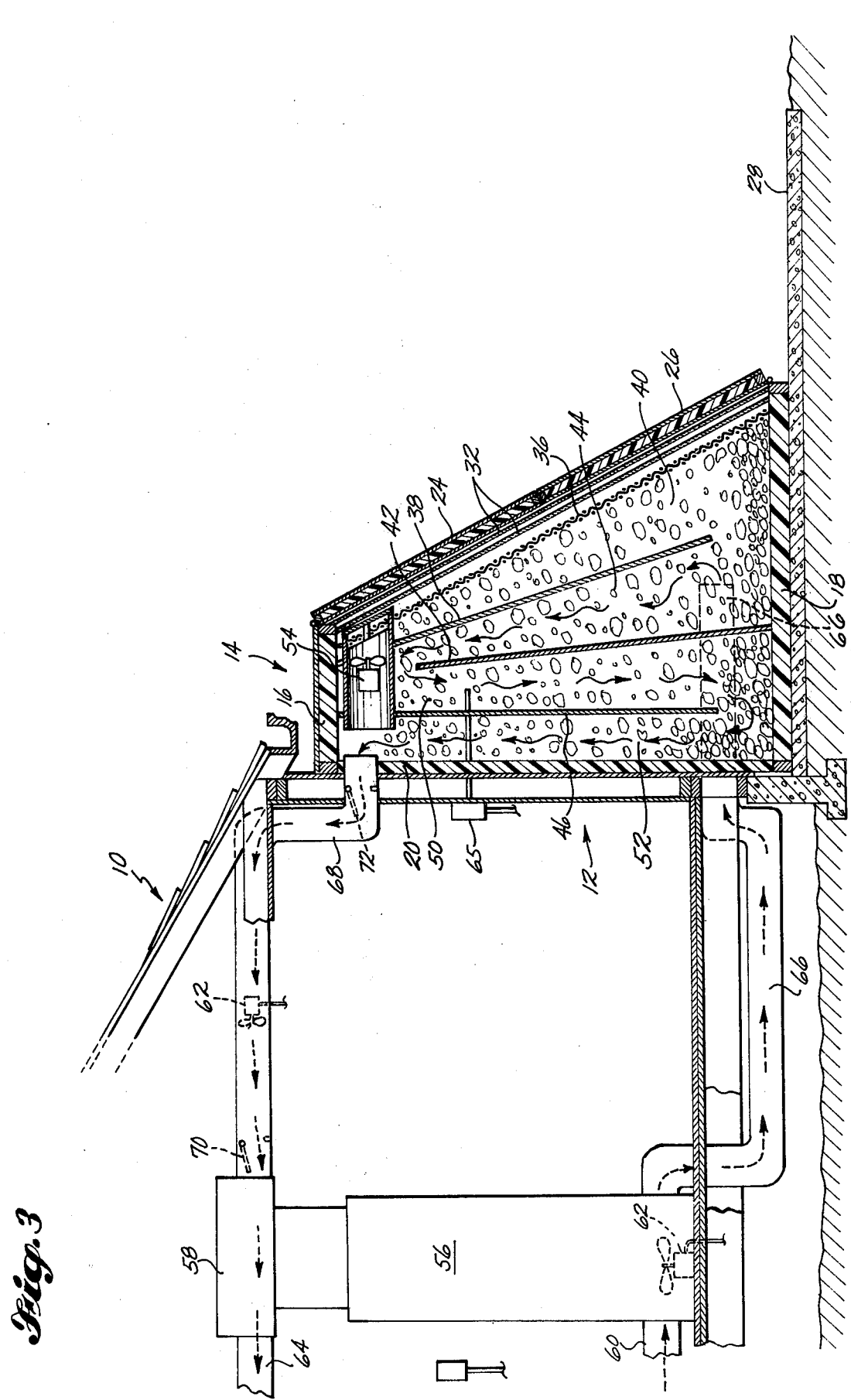
FIG. 3 is a view, similar to FIG. 2, showing the invention in its house heating cycle.

A house furnace and adjuncts thereto are somewhat diagrammatically illustrated by hot air furnace 56, hot air plenum chamber 58, cold air return 60, and blower 62. The furnace may operate in the conventional fashion and air, from the cold air return, is passed through and heated by the furnace 56 and is delivered as hot air to the plenum chamber 58. Thereafter, such hot air is delivered by the hot air ducts, as duct 64, into and thereby heats the house. When the temperature of the rocks in the chambers 40, 44, 50, and 52 is higher than the temperature in the house as indicated by the house thermostat (not shown) and by electric thermocouple 65 (having its sensing element disposed in a rock chamber, as rock chamber 50), then (see FIG. 3) blower 62 will cause air to flow from the cold air return into conduit 66, upwardly in the second chamber 44, downwardly in chamber 50, upwardly in chamber 52, through conduit 68, and urged forwardly by blower 62 into the plenum chamber 58, and then is distributed by the furnace throughout the house in the normal operating fashion of the furnace 56. Preferably, two air check valves 70 and 72 (see FIG. 2) are employed to prevent the air from being circulated by the hot air furnace, during use thereof, when the rock in chambers 40, 44, 50, and 52 is being heated by sun rays and the unit is operating in its heat storage cycle.

SUMMARY

From the foregoing, it will appear that I have provided a heat collector and storage having a front, glass wall unit 32 which extends forwardly and downwardly so the same may be disposed in the path of rays emanating from the sun. Next, a front rock retaining mesh screen wall 36 is disposed in the chamber and in spaced relation to the glass wall 32. This screen wall forms one wall of the rock retaining chamber 40 and also protects the front glass wall 32 from being damaged by rock in the first rock retaining chamber 40. A first baffle wall 38 is disposed in the chamber and in spaced relation to the screen wall 36 and extends generally vertically from either the top wall 16 or the bottom wall 18 and toward but short of the other thereof forming a first rock chamber 40. A second baffle wall 42 extends from the other of said top and bottom walls 16 and 18 and short of the first mentioned wall. In other words, the first baffle wall may extend from the top wall and toward but short of the bottom wall or it may extend from the bottom wall toward but short of the top wall. Depending upon the direction in which the first baffle wall 38 is positioned, then the second baffle wall extends from the other of said top and bottom walls 16, 18. This provides for a circuitous passageway in one direction in the first rock chamber 40 and then in the opposite direction in the second rock retaining chamber 44. Pieces of irregular shaped rocks are disposed in the first and second rock chambers 40 and 44 and with the pieces of rock disposed to the sun's rays in the first rock chamber 40 having a dark or black surface to aid in heat retention in said rocks. Then, air circulation means, such as fan means 54 cause an air flow in one direction in the first rock chamber 40 and in the opposite direction in the second rock chamber 44. Preferably, more than one set of rock chambers is provided and the air flow from the last rock chamber returns to the first rock chamber 40 to continue the circulation through the various rock chambers employed.

Preferably, upper doors 24 are employed as front, ray-masking door means hingedly connected to the top wall 16 of the chamber and such doors are movable into and out of ray-masking position relative to the front, glass wall 32.

A similar arrangement is provided regarding lower front doors 26 and such doors are movable into and out of sun ray-masking position relative to the front, glass wall 32.

In connection with the upper doors 24 and lower doors 26, each is preferably provided with an inner sun ray-reflecting surface 30 so that the doors can be angularly positioned to increase the number of rays passing through the glass, front wall 32 by adding reflected as well as direct penetrating rays.

The heat collecting and storage chamber is shown in combination with a normal hot air furnace, as 56, so that the air being circulated by said house furnace 56 can have its source of hot air as that being heated by the furnace or as being air heated by passing through the heat collector and storage chamber. Preferably, in connection with such a furnace, check valves 70 and 72 are employed to ensure that the air flow by the furnace is always in one direction so that there will be no inadvertent back feed of air from the furnace through the heat collector and storage chamber. Also, a thermocouple 65 is provided so that the circulation of air through the rock chamber to heat the house 10 is responsive to a selected temperature of the rocks in the rock chamber.

Obviously, changes may be made in the forms, dimensions and arrangements of the parts of the invention illustrated and described as an embodiment but not as a limitation of the scope of my invention.

I claim:

1. A heat collector and storage chamber having top and bottom walls forming vertically, spaced apart, horizontally extending walls, comprising a front, glass wall extending forwardly and downwardly in said chamber and disposed in the path of rays emanating from the sun; a front rock retaining mesh screen wall disposed in said chamber and in spaced relation to said glass wall; a first baffle wall disposed in said chamber, and in spaced relation to said screen wall and extending generally vertically from one of said horizontal walls toward but terminating short of the other wall thereof, thereby forming a first rock chamber with an adjacent one of said horizontal walls; a second baffle wall disposed in said chamber and in spaced relation to said first baffle wall and extending generally vertically from the other of said horizontal walls toward but terminating short of the one of said horizontal walls with an entrance adjacent the other of said horizontal walls, thereby forming a second rock chamber; a plurality of dark surfaces, irregular shaped pieces of rock disposed in said first and second rock chambers with spaces between pieces of rock; and air circulation means causing the air to pass in one direction in said first rock chamber, in the opposite direction in said second rock chamber, and to return to the entrance of the first rock chamber.

2. The combination of claim 1, wherein additional rock chambers are provided and air exiting from the second rock chamber is circulated therethrough and then returned to the first rock chamber.

3. The combination of claim 1, wherein an upper front, ray-masking door is hingedly connected with the top of the chamber and is movable into and out of ray-masking position relative to the front glass wall.

4. The combination of claim 1, wherein a lower front, ray-masking door is hingedly connected with the bottom of the chamber, is movable into and out of ray-masking position relative to the front glass wall.

5. The combination of claim 3, wherein the inner surface of said upper front door is provided with a sun ray-reflecting surface.

6. The combination of claim 4, wherein the inner surface of said lower front door is provided with a sun ray-reflecting surface.

7. The combination of claim 1 with a hot air heating furnace having a hot air plenum chamber and a cold air return wherein air leaving said second rock chamber is connected with said hot air plenum chamber through air ducts and said cold air return is connected with said first rock chamber through air duct.

8. The combination of claim 7, wherein air flow check valves are disposed in said air ducts limiting air travel therethrough to predetermined directions.

9. The combination of claim 7, wherein the air circulation means for said rock chambers is responsive to a selected temperature of the rocks in said rock chambers.

* * * * *